Figure 3:
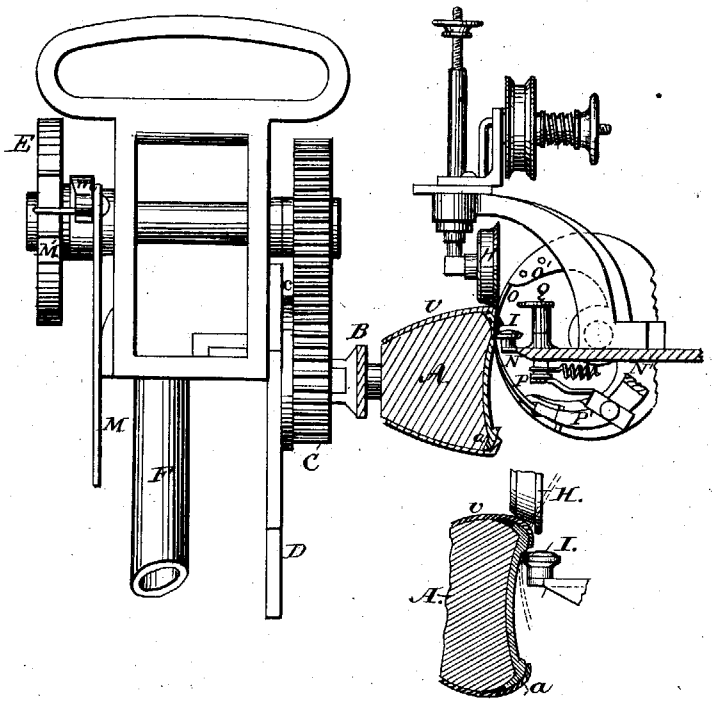

3 Sheets--Sheet 1.
H. DUNHAM, Jr.
Machines for Sewing Boots and Shoes.
No. 6,081. Reissued Oct. 13, 1874.
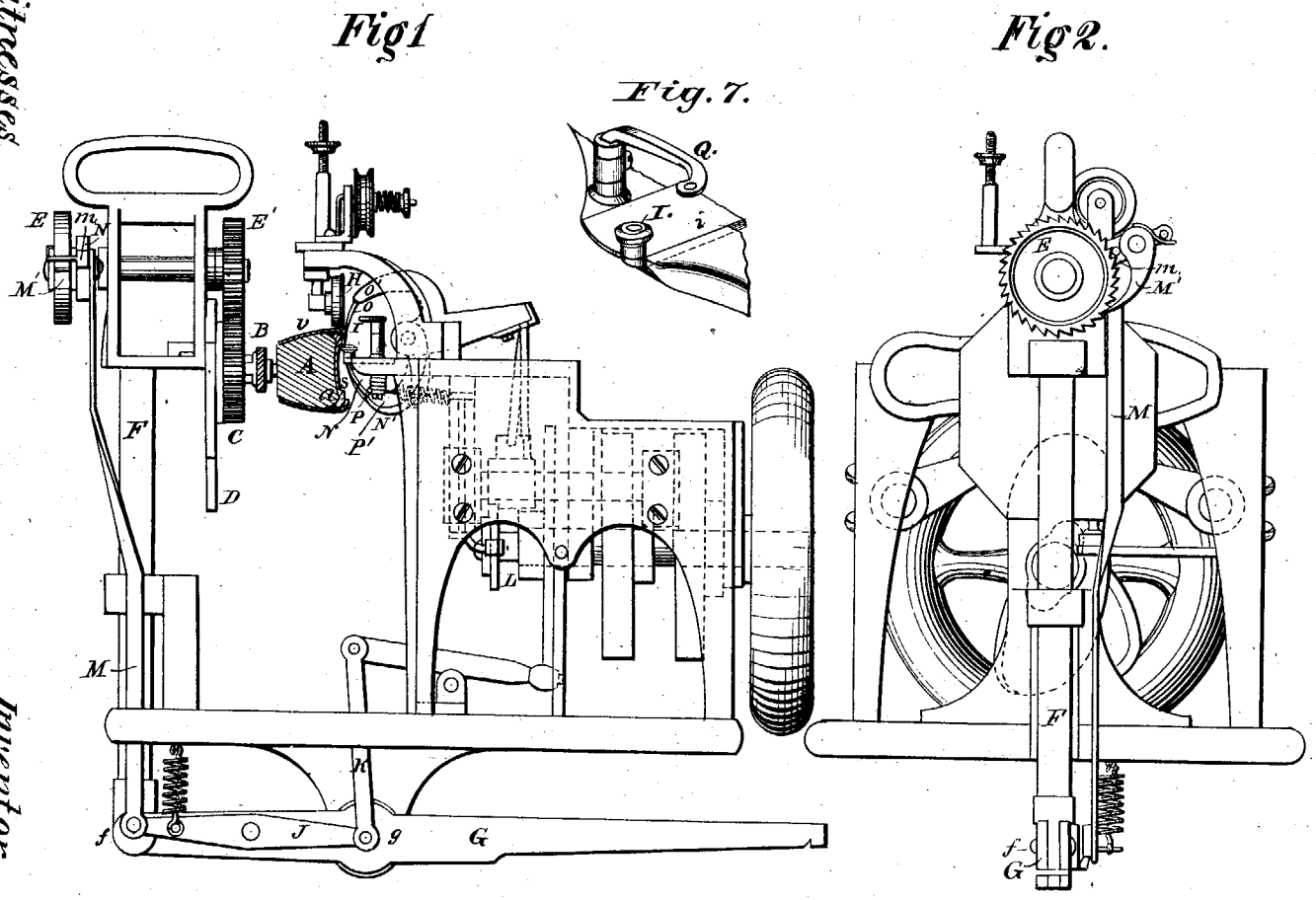
Witnesses
C. A. Campbell
E. N. Callan
Inventor.
Henry Dunham Jr.
by John J. Halsted
Atty.

H. DUNHAM, Jr.

Machines for Sewing Boots and Shoes.

No. 6,081. Reissued Oct. 13, 1874.

Witnesses
C. A. Campbell.
E. N. Callan

Inventors.
Henry Dunham Jr.
by John J. Halsted
Atty.

H. DUNHAM, Jr.

Machines for Sewing Boots and Shoes.

No. 6,081. Reissued Oct. 13, 1874.

*Witnesses*
C. A. Campbell.
E. A. Callan

*Inventors.*
Henry Dunham Jr.
by John J. Halstead
Atty.

UNITED STATES PATENT OFFICE.

HENRY DUNHAM, JR., OF ABINGTON, ASSIGNOR, BY MESNE ASSIGNMENTS, TO GORDON McKAY, TRUSTEE OF THE McKAY SEWING-MACHINE ASSOCIATION, OF BOSTON, MASSACHUSETTS.

IMPROVEMENT IN MACHINES FOR SEWING BOOTS AND SHOES.

Specification forming part of Letters Patent No. 36,396, dated September 9, 1862; reissue No. 13,63, dated December 16 1862; reissue No. 3,386, dated April 20, 1869; reissue No. 6,081, dated October 13, 1874; application filed February 27, 1874.

*To all whom it may concern:*

Be it known that HENRY DUNHAM, JR., of Abington, Massachusetts, invented certain Improvements in Machinery for Sewing Boots and Shoes; and I, GORDON McKAY, trustee, assignee of the entire interest in the said DUNHAM'S invention, hereby declare that the following is a sufficiently full and exact description of the same to enable one skilled in the art to which it appertains to carry it into effect, reference being had to the accompanying drawings, which are made a part of this specification; and the invention relates particularly to the means used for guiding and presenting the work to the action of the stitch-forming mechanism.

In uniting soles to uppers in the manufacture of what are known as turned shoes, (the soles and uppers being wrong-side out when united,) the workman in hand-work uses his intelligence to make with his awl a curved path for the thread, the awl dipping into the sole and then coming out at the same surface and through the upper. For a machine process, where the skill of the workman is wanting, and where the needle must necessarily move in the same fixed path irrespective of the nature of the stock or the relative positions of the parts to be united, it is essential that the respective parts to be united shall be so griped, guided, and presented as to insure the passage of the needle at each advance into and out of the sole, (without penetrating to the ultimately outer face of the sole,) and through the upper; and that the feed-movement shall be such, in connection with the griping and guiding, as to insure the passage of the needle with uniform precision through the corresponding parts along the whole length of the sole and upper brought together to be united. For such work the sole is channeled with a gash, entering at some distance from the sole-edge and extending toward the edge, and the needle-point enters the channel, passing in and coming out at or toward the edge; and to enable the needle-point to reach the channel and thus penetrate, certain things are essential: First, the sole near the edge must be bent with relation to the main portion of the sole to bring the channel and the part of the sole between the bottom of the channel and the sole-edge into the path of the needle, and into such a plane relative to the other portion of the sole that the needle will run clear of the rest of the sole. Next, the sole and upper must be supported at the edge of the sole, or against the direct thrust of the needle-point, and the sole and upper must be griped together. Next, that the edge of the upper must not only be pressed against the sole-edge, but beyond such edge and down against the outermost face of the sole, so that the needle shall properly pass through the parts to be united: There must also be a device entering the channel to keep the channel open and resist the strain of the awl or needle.

This invention relates particularly to the combinations of devices by which these results are obtained.

Figure 4:
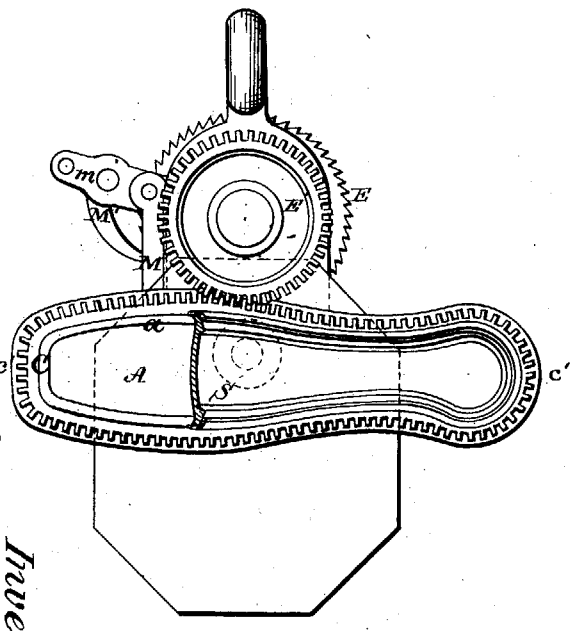
Figure 5:
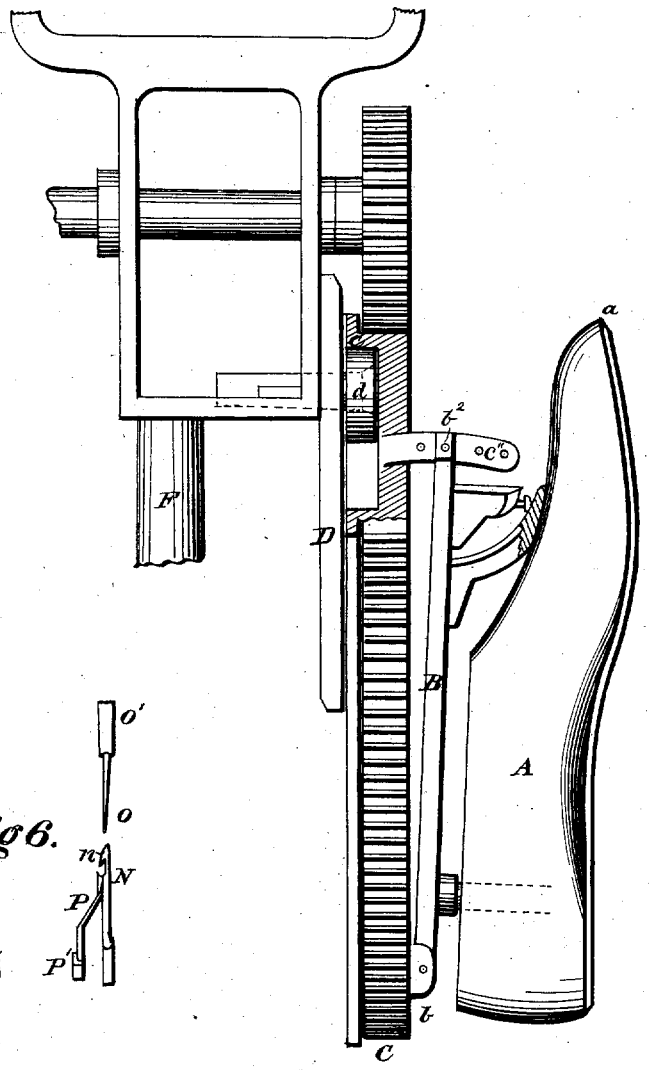
Figure 6:
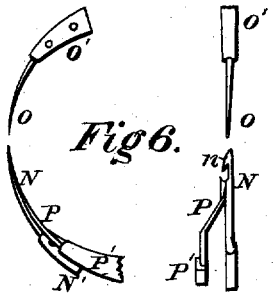

In the drawings, Figure 1 is a side elevation of the machine with the last and last-holder in section. Fig. 2 is a rear view. Fig. 3 is a side elevation, on a larger scale, of the principal operating parts, representing the last and last-holder in section. Fig. 4 is a front view of the last, last-carrier, supporting-plate, and feed mechanism, hereinafter described. Fig. 5 is a side elvation, partly in section, of the last, last-holder, and the carrying and supporting-plates and their connections, representing the moving parts in the position assumed while sewing around the toe. Fig. 6 is a diagram, showing in side and front elevation, the curved awl, needle, and cast-off, in their relative positions. Fig. 7 shows the guide I and its plate *i*, the latter being adjustable in suitable ways on the frame.

In sewing turned shoes the work is applied to a last, A, which is preferably formed with a concave bottom, and is so chamfered or beveled near its periphery as to form around the margin of the bottom a defined ridge, *a*, around which the margin of the sole is pressed, and held in the act of sewing in proper position to receive the margin of the upper which is to be sewed thereto. The last is mounted upon a last-holder, B, hinged at *b* to a carrying-plate, C, which is sustained in proper position by a supporting-plate, D, against the face of which it turns, and by a wheel or roller, *d*, upon the said supporting-plate, engaging with a flange, *c*, on the movable last-carrying plate C. The carrying-plate C is employed to communicate the feed-movement to the work. For this purpose its periphery is made of a form approximating to that of the last, and is provided with cogs $c^1$, acted upon by a pinion, E′, upon the shaft of which is mounted a ratchet-wheel, E. The free end of the hinged last-holder B works over a stud, $c^2$, projecting horizontally from the plate C, and perforated with a number of holes, in either of which a pin, $b^2$, may be placed for the purpose of setting the toe of the last in or out in relation to the heel. The parts above described are mounted upon a standard, F, hinged at *f* to a lever, G, which is fulcrumed at *g* to the stationary frame of the machine. The hinge *f* allows horizontal play to the standard F, in order that the distance of the last-holder from the sewing mechanism may be varied, as irregularities in the work, or other circumstances, may render necessary. By the vertical play of the supporting-lever G the work may be constantly held up to the sewing mechanism. The bearing against which the work is thus held for sewing is preferably constructed in the form of a flanged wheel, H, the pressing-surface of which is adapted to hold the edge of the upper U firmly and snugly around the edge of the sole S, as represented in Fig. 3. The guiding of the work is effected, in conjunction with the mechanism already described, by a wheel or plate, I, working in the customary channel of the sole, and serving also to open the said channel preparatory to sewing. The two guides H I serve not only to determine the correct position of the work, but to govern the points of entrance and exit of the needle. The guide I runs in the channel, and the sole and guide are pressed firmly together as the stitch is being formed in the sole. This guide is mounted on an adjustable plate, and is movable across the path of the needle's movement; and, by adjusting this guide with reference to the path in which the needle moves, the depth of the stitch in the sole and its exit from the sole at or near its edge are regulated. The intermittent feed-movement is communicated through a short lever, J, having its fulcrum upon the lever G, and so proportioned and applied that it will operate with great effect in all positions of the lever G. To one end of the lever J is attached a rod, K, actuated by the cam-shaft L, and to the other a rod, M, which is pivoted to a lever, *m*, carrying a pawl, M′, which actuates the ratchet-wheel E. The sewing is effected by a curved hooked needle, N, mounted in a curved lever N′. This needle is so constructed and applied that its outer surface will be concentric, or nearly so, with the center of motion, and has an elliptical form in its transverse section to adapt it to produce or pass through a hole, which is elongated in a direction parallel with the edge of the sole. The preliminary punching of the work may be effected by an awl, O, having a curvature concentric with and similar to that of the needle N, and so flattened as to produce an elongated hole, in the manner already explained. O′ represents the curved lever to which the awl is attached. The hook *n* is formed upon the side or flank of the needle N, rather than upon its curved front or back. Hence its projection is lengthwise of the elliptical hole produced by the awl or needle, and any lateral or radial straining of the leather is avoided. The hooked needle N, while projecting through the work, takes the thread from a vibrating thread-carrier, Q, of common form, draws the loop down through the work and through the loop previously formed, which rests upon a needle-closer or cast-off, P, so as to prevent the needle-hook catching the old loop a second time. The needle-closer is carried by a lever, P′, which vibrates on the same center as the levers N′ and O′. The needle-hook, as soon as it is withdrawn from the sole, is closed by the said cast-off, which then moves with the needle in its descent, and again rises with it until the needle is about to re-enter the work, at which time the cast-off or needle-closer P rests on the outside of the work. The loop last formed, as it leaves the cavity of the hook, is caught by the needle-closer, and retained until the needle, having passed up through the work, draws a new loop down through it, in the manner already explained.

I claim—

1. In a machine for sewing boots and shoes known as turns, and operating to connect a sole and upper, mounted on a last, the guide or channel-opener that enters the channel in and bears against the inner face of the sole or channel, when combined with the guide or surface against which the upper at the edge of the sole rests, and with a needle and thread-guide operating to connect such sole and upper by stitches which pass into the sole.

2. In a machine for sewing turned shoes, the combination, with the guide made to enter in and bear against the inner face of the sole or channel, of the guide or surface constructed to hold and bear the outer edge of the sole toward the face of the last, so that the needle may enter and pass from the same side of the sole.

3. The last, having the ledge or edge *a* adapted to bear on the sole between the channel and edge of the sole, in combination with guides or gages H and I, the combination operating to bend the sole about such ledge or ridge for the passage of the needle.

4. In combination with a last-carrier, supported substantially as described, so that its distance from the sewing mechanism may be varied, a feed-movement, acting through the said last-carrier, as set forth.

5. The combination of the guides or gages H and I, bearing against the same side or face of the work, for the purpose of regulating the entrance and exit of the needle or other piercing instrument, and the distance of the stitches from the edge of the sole.

6. The guide or bearing H, when constructed with two bearing faces or surfaces adapted to bear on or hold the upper around the edge of the sole, substantially as described.

7. The guide I, combined with the needle, and rendered adjustable with reference to the path in which the needle moves, as and for the purpose set forth.

8. The curved needle N, when constructed with a hook upon its side or flank, substantially as described.

9. The combination of the curved needle N and the cast-off P, constructed and operating substantially as and for the purposes stated.

10. The combination of the curved awl O and curved hooked needle N, substantially as described.

GORDON McKAY,
*Trustee McKay Sewing-Machine Association.*

Witnesses:
DAVID T. S. FULLER,
CH. I. THIRION, JR.